(12) United States Patent
Suzuki et al.

(10) Patent No.: US 10,050,310 B2
(45) Date of Patent: Aug. 14, 2018

(54) NON-AQUEOUS ELECTROLYTIC SOLUTION AND NON-AQUEOUS ELECTROLYTE SECONDARY CELL USING SAME

(71) Applicant: PANASONIC CORPORATION, Osaka (JP)

(72) Inventors: Hirotetsu Suzuki, Osaka (JP); Nobuhiko Hojo, Osaka (JP); Takayuki Nakatsutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 14/904,596

(22) PCT Filed: Jul. 18, 2014

(86) PCT No.: PCT/JP2014/003834
§ 371 (c)(1),
(2) Date: Jan. 12, 2016

(87) PCT Pub. No.: WO2015/008496
PCT Pub. Date: Jan. 22, 2015

(65) Prior Publication Data
US 2016/0156067 A1    Jun. 2, 2016

(30) Foreign Application Priority Data

Jul. 19, 2013 (JP) .................................. 2013-150620
Apr. 16, 2014 (JP) .................................. 2014-084422

(51) Int. Cl.
*H01M 10/0569* (2010.01)
*H01M 10/052* (2010.01)
(Continued)

(52) U.S. Cl.
CPC ..... *H01M 10/0569* (2013.01); *H01M 10/052* (2013.01); *H01M 10/054* (2013.01);
(Continued)

(58) Field of Classification Search
CPC ..... H01M 2300/0037; H01M 10/0569; H01M 10/0566; H01M 10/0567;
(Continued)

(56) References Cited

U.S. PATENT DOCUMENTS

2010/0062345 A1* 3/2010 Horikawa ......... H01M 10/0525
                                                                   429/332
2012/0009485 A1* 1/2012 Xu .......................... H01G 11/58
                                                                   429/336
(Continued)

FOREIGN PATENT DOCUMENTS

CN          101682089 A      3/2010
JP          2004-055208 A    2/2004
(Continued)

OTHER PUBLICATIONS

Chinese Search Report issued in Application No. 201480040822.0 dated Feb. 17, 2017, with English translation.
(Continued)

*Primary Examiner* — Ula C Ruddock
*Assistant Examiner* — Amanda Barrow
(74) *Attorney, Agent, or Firm* — McDermott Will & Emery LLP

(57) ABSTRACT

A non-aqueous electrolytic solution of the present invention includes: a solvent component including a glyme solvent and a phosphazene solvent; and an alkali metal salt composed of an alkali metal cation and an anion, the alkali metal salt being dissolved in the solvent component. The phosphazene solvent is a cyclic phosphazene compound represented by the formula (1).

(Continued)

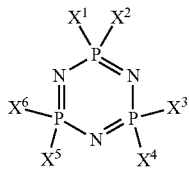

(1)

where $X^1$ to $X^6$ each independently represent a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.

10 Claims, 1 Drawing Sheet

(51) Int. Cl.
*H01M 10/0568* (2010.01)
*H01M 10/054* (2010.01)

(52) U.S. Cl.
CPC .............. *H01M 10/0568* (2013.01); *H01M 2300/0037* (2013.01); *Y02T 10/7011* (2013.01)

(58) Field of Classification Search
CPC . H01M 2300/0028; H01M 2300/0031; H01M 2300/0034
See application file for complete search history.

(56) References Cited

U.S. PATENT DOCUMENTS

| | | | | |
|---|---|---|---|---|
| 2013/0183592 A1* | 7/2013 | Roev | ............. | H01M 4/8605 429/405 |
| 2013/0295470 A1* | 11/2013 | Shatunov | ............. | C07F 9/65815 429/338 |
| 2013/0330609 A1* | 12/2013 | Sawa | ............. | H01M 4/587 429/200 |
| 2014/0199600 A1* | 7/2014 | Yawata | ............. | H01M 10/0567 429/330 |
| 2014/0342240 A1* | 11/2014 | Harrup | ............. | H01M 10/0567 429/326 |

FOREIGN PATENT DOCUMENTS

| | | | |
|---|---|---|---|
| JP | 2012-059391 A | 3/2012 | |
| JP | 2012-209145 A | 10/2012 | |
| JP | 2013-033663 A | 2/2013 | |
| WO | WO 2012/108270 * | 8/2012 | ........ H01M 10/0567 |
| WO | 2013/032004 A1 | 3/2013 | |

OTHER PUBLICATIONS

International Search Report dated Sep. 9, 2014, issued in corresponding International Application No. PCT/JP2014/003834. (w/ English translation).

* cited by examiner

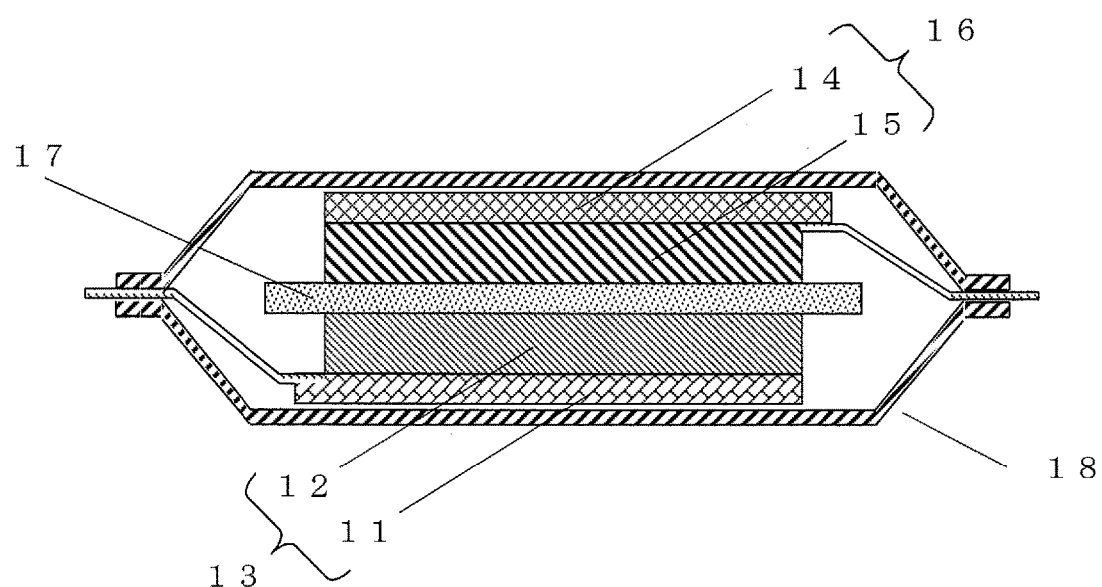

NON-AQUEOUS ELECTROLYTIC SOLUTION AND NON-AQUEOUS ELECTROLYTE SECONDARY CELL USING SAME

RELATED APPLICATIONS

This application is the U.S. National Phase under 35 U.S.C. § 371 of International Application No. PCT/JP2014/003834, filed on Jul. 18, 2014, which in turn claims the benefit of Japanese Application No. 2013-150620, filed on Jul. 19, 2013, and Japanese Application No. 2014-084422, filed Apr. 16, 2014, the disclosures of which Applications are incorporated by reference herein.

TECHNICAL FIELD

The present invention relates to a non-aqueous electrolytic solution and a non-aqueous electrolyte secondary cell using the same.

BACKGROUND ART

Non-aqueous electrolyte secondary cells, especially lithium secondary cells, are characterized by having a high voltage and a high energy density, and are excellent in terms of storage performance and output performance; therefore, they are used in a variety of electrical products. Recently, sodium secondary cells using sodium ions as carrier ions instead of lithium ions have been attracting attention as low-cost non-aqueous electrolyte secondary cells.

An organic solvent, such as a carbonate ester, which is used in an electrolytic solution of a non-aqueous electrolyte secondary cell has a low flash point ranging from 10 to 160° C. With this in mind, various approaches have been taken to ensure the safety of such a cell even when a foreign matter is accidentally present in the cell or when the cell falls into an abnormal condition such as an overcharge condition due to malfunction of a cell controller or a charger.

As examples of the product of an attempt aimed at improving the safety of a cell in terms of an electrolytic solution, there have been disclosed lithium-ion cells using an electrolytic solution including an organic solvent such as a carbonate ester and a liquid phosphazene flame retardant added to the organic solvent (see Patent Literature 1 and 2).

Patent Literature 1 discloses a lithium-ion cell using an electrolytic solution including: two organic solvents, ethylene carbonate and diethyl carbonate; and a liquid phosphazene flame retardant added to the organic solvents, the liquid phosphazene flame retardant having an ethoxy group which is the same functional group as that of diethyl carbonate. Specifically, it is disclosed that the liquid phosphazene flame retardant can be added in an amount of 5 to 35 mass % to a non-aqueous electrolytic solution containing carbonates as main components. It is also disclosed that the use of this electrolytic solution makes it possible, when the lithium-ion cell is left for a long period of time, to keep the phosphazene from causing a functional group substitution reaction with the organic solvents and thus maintain the properties of the phosphazene as a flame retardant, so that the flame retardancy of the non-aqueous electrolytic solution can be exhibited sufficiently to ensure the safety of the cell when the cell is in an abnormal condition.

Patent Literature 2 discloses a cell using a non-aqueous electrolytic solution in which are mixed a phosphazene flame retardant and a fluorine-substituted ether whose flash point is undetectable. Specifically, it is disclosed that 0 to 10 weight % of the phosphazene flame retardant and 0 to 50 weight % of the fluorine-substituted ether can be added to the non-aqueous electrolytic solution containing a carbonate as a main component. It is also disclosed that the fluorine-substituted ether is a linear ether compound represented by R1-O-R2 (R1 and R2 are each an alkyl group having 1 to 10 carbon atoms), at least some of whose hydrogen atoms are substituted with fluorine atoms. Thanks to the mixing of the phosphazene flame retardant, the electrolytic solution can prevent burning of the cell caused by abnormal increase in temperature of the cell and stabilize the behavior of the cell, thereby ensuring the safety of the cell. It is further disclosed that the mixing of the fluorine-substituted ether limits the increase in viscosity of the non-aqueous electrolytic solution caused by the mixing of the phosphazene flame retardant, and hence ensures ion mobility in the non-aqueous electrolytic solution, thereby making it possible to reduce the deterioration in high-rate discharge characteristics.

CITATION LIST

Patent Literature

Patent Literature 1: JP 2012-059391 A
Patent Literature 2: WO 2013/032004 A1

SUMMARY OF INVENTION

Technical Problem

However, there is a problem in that the ratio of the amount of the liquid phosphazene flame retardant added to the non-aqueous electrolytic solution should be in a narrow range, and specifically should be limited between 5 and 35 mass %. Patent Literature 1 states that this is because in the case where the ratio of the amount of the liquid phosphazene flame retardant added is not less than 35 mass %, the movement of lithium ions between the active materials and the non-aqueous electrolytic solution is inhibited, and proper charge/discharge process cannot take place, while in the case where the ratio of the amount of the liquid phosphazene flame retardant added is less than 5 mass %, the flame retardancy is less likely to be exhibited due to the low ratio of the amount of the flame retardant when the cell is in an abnormal condition.

The technique of Patent Literature 2 also has a problem in that the ratio of the amount of the liquid phosphazene flame retardant added to the non-aqueous electrolytic solution should be in a narrow range, and specifically should be limited between 0 and 10 mass %.

In view of the above circumstances, the present disclosure provides a non-aqueous electrolytic solution for which the mixing ratio of the liquid phosphazene flame retardant can be arbitrarily adjusted over a wider range than for the conventional non-aqueous electrolytic solutions.

Solution to Problem

A non-aqueous electrolytic solution according to one aspect of the present invention includes:
a solvent component including a glyme solvent and a phosphazene solvent; and
an alkali metal salt composed of an alkali metal cation and an anion, the alkali metal salt being dissolved in the solvent component, wherein the phosphazene solvent is a cyclic phosphazene compound represented by the following formula (1).

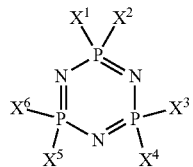

(1)

where $X^1$ to $X^6$ each independently represent a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.

Advantageous Effects of Invention

In the non-aqueous electrolytic solution according to one aspect of the present invention, the ratio of the amount of the liquid phosphazene flame retardant added can be arbitrarily adjusted; that is, the ratio of the amount of the liquid phosphazene flame retardant added can be arbitrarily controlled depending on the intended use, with the result that the flexibility in designing an electrolytic solution can be increased. Additionally, according to this aspect of the present invention, a safer non-aqueous electrolytic solution can be provided, for example, by setting the ratio of the amount of the added liquid phosphazene flame retardant higher than in the case of the conventional non-aqueous electrolytic solutions.

BRIEF DESCRIPTION OF DRAWINGS

FIG. 1 is a cross-sectional view showing an alkali metal secondary cell according to an exemplary embodiment.

DESCRIPTION OF EMBODIMENTS

The present inventors have made a detailed study of a non-aqueous electrolytic solution containing an alkali metal salt and a phosphazene solvent from the viewpoint of the solubility of the alkali metal salt and the compatibility of the solvent, and have finally found that, when a specified solvent is contained as a third component in addition to the alkali metal salt and the phosphazene solvent, it is possible to obtain a non-aqueous electrolytic solution which can be prepared at an arbitrary composition ratio, with the alkali metal salt being sufficiently dissolved and without the phase separation between the phosphazene solvent and the solvent as the third component.

A first aspect of the present invention provides a non-aqueous electrolytic solution including:

a solvent component including a glyme solvent and a phosphazene solvent; and an alkali metal salt composed of an alkali metal cation and an anion, the alkali metal salt being dissolved in the solvent component, wherein the phosphazene solvent is a cyclic phosphazene compound represented by the following formula (1).

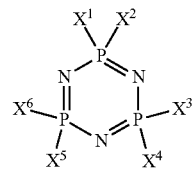

(1)

where $X^1$ to $X^6$ each independently represent a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.

A second aspect of the present invention provides the non-aqueous electrolytic solution as set forth in the first aspect, wherein a volume ratio of the phosphazene solvent to a total solvent volume is 42 to 88%. In the non-aqueous electrolytic solution according to the second aspect, the volume ratio of the phosphazene solvent to the total solvent volume can be made higher than those in conventional non-aqueous electrolytic solutions. That is, in the non-aqueous electrolytic solution according to the second aspect, the volume ratio of the phosphazene solvent to the total solvent volume can be appropriately adjusted.

A third aspect of the present invention provides the non-aqueous electrolytic solution as set forth in the first or second aspect, wherein the glyme solvent includes a compound represented by the following formula (2):

$$R^2-O(CX^7X^8-CX^9X^{10}-O)_n-R^3 \qquad (2),$$

where $X^7$ to $X^{10}$ each independently represent a hydrogen atom or a halogen atom, $R^2$ and $R^3$ each independently represent an aromatic group, an unsaturated aliphatic group, or a saturated aliphatic group, the aromatic group, the unsaturated aliphatic group, and the saturated aliphatic group each optionally contain a halogen atom, a nitrogen atom, an oxygen atom, a sulfur atom, or a silicon atom, the unsaturated aliphatic group and the saturated aliphatic group are each linear or cyclic, and n is an integer of 1 to 6.

In the non-aqueous electrolytic solution according to the third aspect, the glyme solvent includes the compound represented by the above general formula. Therefore, both sufficient dissolution of the alkali metal salt and excellent oxidation resistance can be achieved. Hence, the non-aqueous electrolytic solution according to the third aspect can contribute also to the charge/discharge reaction of an active material capable of yielding a voltage as high as about 4 V.

A fourth aspect of the present invention provides the non-aqueous electrolytic solution as set forth in the third aspect, wherein in the formula (2), n is an integer of 1 to 4, and $X^7$ to $X^{10}$ are each a hydrogen atom. Since n is 1 to 4, the non-aqueous electrolytic solution according to the fourth aspect has appropriate flowability while having strong interaction with the alkali metal cation, and can therefore be advantageously used as a solvent.

A fifth aspect of the present invention provides the non-aqueous electrolytic solution as set forth in the third aspect, wherein the glyme solvent is a compound represented by the formula (2) where n is an integer of 2 to 4, and the glyme solvent is contained in an amount of 0.95 mol or more and 1.05 mol or less per mol of the alkali metal salt.

A sixth aspect of the present invention provides the non-aqueous electrolytic solution as set forth in the third aspect, wherein when n is 1 in the formula (2), the glyme solvent is contained in an amount of 1.95 mol or more and 2.05 mol or less per mol of the alkali metal salt. In the non-aqueous electrolytic solutions according to the fifth and sixth aspects, the alkali metal salt and the glyme solvent are contained at ratios as specified above. Therefore, even when the phosphazene solvent is used as a main solvent, the solubility of the alkali metal salt can be held sufficient. A seventh aspect of the present invention provides the non-aqueous electrolytic solution as set forth in the third aspect, wherein in the formula (2), n is 3.

An eighth aspect of the present invention provides the non-aqueous electrolytic solution as set forth in any one of the first to seventh aspects, wherein the anion is at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2—CF_2CF_2SO_2—)^-$, and $[N—(SO_2F)—(SO_2CF_3)]^-$. The non-aqueous electrolytic solution according to the eighth aspect contains at least one of these anions, and hence is excellent in terms of the solubility of the alkali metal salt.

A ninth aspect of the present invention provides the non-aqueous electrolytic solution as set forth in any one of the first to eighth aspects, wherein the solvent component essentially consists of the glyme solvent and the phosphazene solvent. The non-aqueous electrolytic solution according to the ninth aspect has excellent flame retardancy thanks to the phosphazene solvent. Also, thanks to the glyme solvent, the alkali metal salt is sufficiently dissolved and, at the same time, the oxidation resistance of the non-aqueous electrolytic solution is excellent. Therefore, the non-aqueous electrolytic solution according to the ninth aspect can contribute also to the charge/discharge reaction of an active material capable of yielding a voltage as high as about 4 V.

A tenth aspect of the present invention provides the non-aqueous electrolytic solution as set forth in any one of the first to eighth aspects, wherein the solvent component further includes at least one selected from the group consisting of a carbonate solvent and an ester solvent. In the case of the non-aqueous electrolytic solution according to the tenth aspect, the ratio of the phosphazene solvent to the total solvent volume in the non-aqueous electrolytic solution can be made high; therefore, the non-aqueous electrolytic solution can have high flame retardancy and appropriate flowability, and can thus be advantageously used as an electrolytic solution.

An eleventh aspect of the present invention provides the non-aqueous electrolytic solution as set forth in any one of the first to tenth aspects, wherein the alkali metal cation is a lithium ion or a sodium ion. The non-aqueous electrolytic solution according to the eleventh aspect can be obtained as a non-aqueous electrolytic solution for a non-aqueous electrolyte secondary cell having a high voltage of 3 V or more resulting from the lower standard electrode potential of the lithium ions or sodium ions.

A twelfth aspect of the present invention provides the non-aqueous electrolytic solution according to any one of the first to eleventh aspects, wherein the glyme solvent coordinates to the alkali metal cation. The non-aqueous electrolytic solution according to the twelfth aspect is a non-aqueous electrolytic solution in which the glyme solvent coordinates to the alkali metal cation, and is excellent in terms of the solubility of the alkali metal salt; that is, the non-aqueous electrolytic solution can have a high concentration of the dissolved alkali metal salt.

A thirteenth aspect of the present invention provides a non-aqueous electrolyte secondary cell including: the non-aqueous electrolytic solution as set forth in any one of the first to twelfth aspects; a positive electrode including a positive electrode active material capable of absorbing and releasing an alkali metal cation; and a negative electrode including a negative electrode active material capable of absorbing and releasing an alkali metal cation. The non-aqueous electrolyte secondary cell according to the thirteenth aspect includes a non-aqueous electrolytic solution that can contain a liquid phosphazene flame retardant at a wider range of ratios than conventional ones, i.e., at an arbitrary ratio; therefore, the balance between safety and performance can be relatively freely set. Hence, the non-aqueous electrolyte secondary cell according to the thirteenth aspect can be obtained, for example, as a secondary cell that is highly safe and that also has a high voltage and a high energy density.

First Embodiment

Hereinafter, an embodiment of a non-aqueous electrolytic solution according to one aspect of the present invention will be described more specifically.

The electrolytic solution according to one aspect of the present invention is a non-aqueous electrolytic solution including: a solvent component including a glyme solvent and a phosphazene solvent; and an alkali metal salt composed of an alkali metal cation and an anion, the alkali metal salt being dissolved in the solvent component.

The present inventors have made a detailed study of a non-aqueous electrolytic solution containing an alkali metal salt and a phosphazene solvent from the viewpoint of the solubility of the alkali metal salt and the compatibility of the solvent, and have finally found that, when a glyme solvent is contained as a third component in addition to the alkali metal salt and the phosphazene solvent, it is possible to obtain a non-aqueous electrolytic solution which can be prepared at an arbitrary composition ratio, with the alkali metal salt being sufficiently dissolved and without the phase separation between the phosphazene solvent and the glyme solvent as the third component.

The mechanism of homogeneous mixing in the non-aqueous electrolytic solution according to one aspect of the present invention will now be described in comparison with a conventional non-aqueous electrolytic solution containing a carbonate ester and a phosphazene solvent.

First, the mechanism of mixing in a conventional non-aqueous electrolytic solution containing a carbonate ester and a phosphazene solvent will be described. Generally, a phosphazene solvent has a very low molecular polarity and is incapable of dissolving an alkali metal salt. In contrast, a carbonate ester solvent has a sufficient molecular polarity, and is therefore capable of dissolving an alkali metal salt by solvation of the carbonate ester with the cations of the alkali metal salt. With this in mind, non-aqueous electrolytic solutions including a mixed solvent prepared by mixing a carbonate ester solvent with a phosphazene and an alkali metal salt added to the mixed solvent have been conventionally studied. However, a study by the present inventors has revealed that, in such a system, increasing the amount of the phosphazene solvent relative to the carbonate ester solvent readily leads to phase separation in the non-aqueous electrolytic solution. One of the separated phases was a phase mainly including the carbonate ester containing the alkali metal salt, and the other was a phase mainly including the phosphazene not containing the alkali metal salt.

As a result of a detailed study of the cause of the above phenomenon, the following conclusion has been reached for the mechanism of the phase separation. That is, it has been found that when a large number of molecules of the carbonate ester solvent solvate with or surround the alkali metal cations to reduce the surface charge density of the alkali metal cations sufficiently, a certain amount or less of the phosphazene solvent of low polarity can be fully mixed, while when the amount of the phosphazene solvent is increased relative to the carbonate ester solvent, the amount of the carbonate ester solvent becomes insufficient to reduce the surface charge density of the alkali metal cations sufficiently and allow the phosphazene solvent of low polarity to be fully mixed, with the result that the phase separation occurs due to the separation of the phase of the excess phosphazene.

In view of the above results for conventional non-aqueous electrolytic solutions, various studies were made to find a solvent that has the function of strongly interacting with alkali metal cations, thus reducing the surface charge density of the cations sufficiently, and hence allowing mixing of a large amount of a phosphazene solvent of low polarity. As a result, a glyme solvent has been found to exhibit such a function. The glyme solvent in the non-aqueous electrolytic solution according to one aspect of the present invention interacts with alkali metal cations very strongly, and can reduce the surface charge density of the alkali metal cations efficiently. Therefore, homogeneous mixing of a phosphazene solvent of low polarity with a non-aqueous solvent containing a dissolved alkali metal salt can be achieved at an arbitrary ratio without phase separation.

The phosphazene solvent that can be used in the non-aqueous electrolytic solution according to one aspect of the present invention is a liquid compound containing phosphorus and nitrogen as constituent elements and having a double bond. Specifically, the phosphazene solvent is a cyclic phosphazene compound represented by the following formula (1).

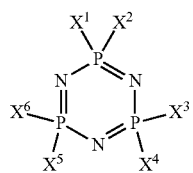

(1)

[In the formula (1), $X^1$ to $X^6$ each independently represent a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.]

Such a phosphazene compound is known as a flame retardant that exerts the effect of preventing ignition or extinguishing fire in a high-temperature environment.

Cyclic phosphazene compounds are more stable electrochemically than chain phosphazene compounds; therefore, when used as a solvent in a non-aqueous electrolytic solution, a cyclic phosphazene compound can contribute to maintaining the flame retardancy of the non-aqueous electrolytic solution and the high performance of the cell over a long period of time. Additionally, the cyclic phosphazene compound represented by the above formula (1) is more stable electrochemically and less decomposable than, for example, other types of cyclic phosphazene compounds containing an amino group in a substituent. Therefore, when used as a solvent in a non-aqueous electrolytic solution, the cyclic phosphazene compound represented by the above formula (1) can make a greater contribution to maintaining the flame retardancy of the non-aqueous electrolytic solution and the high performance of the cell over a long period of time than, for example, other types of cyclic phosphazene compounds containing an amino group in a substituent. For these reasons, the higher the proportion of the phosphazene solvent in the solvent component of the non-aqueous electrolytic solution of the present embodiment, the more marked the effect provided by the cyclic phosphazene compound represented by the above formula (1) which is used in the non-aqueous electrolytic solution, that is, the effect of maintaining the flame retardancy of the non-aqueous electrolytic solution and the high performance of the cell over a long period of time.

The cyclic phosphazene compound represented by the above formula (1) can be synthesized, for example, by a commonly-known reaction using hexafluorophosphazene and sodium alkoxide, the reaction being represented by the following reaction formula.

[Reaction Formula]

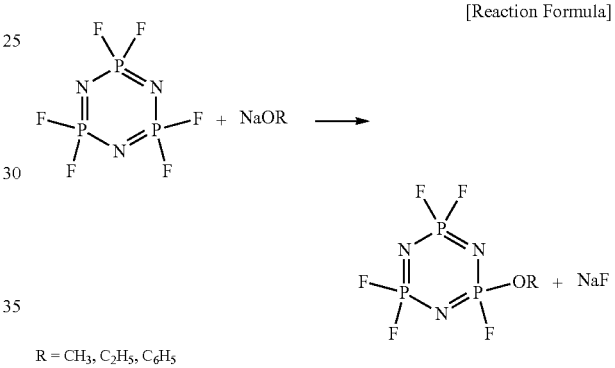

$R = CH_3, C_2H_5, C_6H_5$

The glyme solvent that can be used in the non-aqueous electrolytic solution according to one aspect of the present invention refers to a glycol diether, and is specifically an aprotic solvent which is a glycol ether terminally substituted with an alkyl group. A compound represented by the following formula (2) can be used as the glyme solvent.

$$R^3-O(CX^7X^8-CX^9X^{10}-O)_n-R^3 \qquad (2)$$

In this formula, $X^7$ to $X^{10}$ each independently represent a hydrogen atom or a halogen atom, $R^2$ and $R^3$ each independently represent an aromatic group, an unsaturated aliphatic group, or a saturated aliphatic group, the aromatic group, the unsaturated aliphatic group, and the saturated aliphatic group each optionally contain a halogen atom, a nitrogen atom, an oxygen atom, a sulfur atom, or a silicon atom, the unsaturated aliphatic group and the saturated aliphatic group are each linear or cyclic, and n is an integer of 1 to 6.

The glyme solvent has a large number of C—O bonds consisting of carbon C and oxygen O and having a large dipole moment. Additionally, since the rotational barrier about the bond is low, various conformations are possible. For these reasons, the glyme solvent can strongly interact with alkali metal cations, that is, can coordinate to alkali metal cations to dissolve an alkali metal salt and reduce the surface charge density of the alkali metal cations sufficiently.

$X^7$ to $X^{10}$ in the above formula (2) may all be hydrogen atoms or may each be any one selected from a hydrogen atom and a fluorine atom. In these cases, the glyme solvent is more excellent in terms of the electrochemical stability and the strength of interaction with alkali metal cations.

$R^2$ and $R^3$ in the above formula (2) may each be independently a saturated aliphatic group or an aromatic group. The saturated aliphatic group may be an alkyl group or an alkyl group some of whose hydrogen atoms are optionally substituted with fluorine atoms. The aromatic group may be a phenyl group or a phenyl group some of whose hydrogen atoms are optionally substituted with fluorine atoms. In these cases, the glyme solvent is more excellent in terms of the electrochemical stability and the strength of interaction with alkali metal cations. When the alkyl group has a large number of carbon atoms, the interaction with alkali metal cations is sterically inhibited. Therefore, the number of carbon atoms is preferably small. The number of carbon atoms is preferably not more than 4.

In the above formula (2), n representing the number of repeating ethylene oxide units is preferably 1 to 6, and more preferably 1 to 4. This is because, when n is 1 to 4, the glyme solvent has appropriate flowability while maintaining a strong interaction with alkali metal cations, and can therefore be advantageously used as a solvent.

Additionally, in the formula (2), n may be an integer of 2 to 4, and the glyme solvent may be contained in an amount of 0.95 mol or more and 1.05 mol or less per mol of the alkali metal salt. When n is 1 in the above formula (2), the glyme solvent may be contained in an amount of 1.95 mol or more and 2.05 mol or less per mol of the alkali metal salt. By having the alkali metal salt and the glyme solvent contained at such a ratio in the non-aqueous electrolytic solution, the solubility of the alkali metal salt can be held sufficient even when the phosphazene solvent is used as a main solvent. Additionally, n may be 3 in the above formula (2).

When the alkali metal salt used in the electrolytic solution according to one aspect of the present invention is represented by MX, M is an alkali metal which becomes a cation, and X is a substance which becomes a counter anion. The alkali metal M which becomes a cation is not particularly limited. Any alkali metals which are used as a supporting electrolyte or an active material in usual secondary cells can be used. Specific examples include Li, Na, K, Rb, and Cs. Li or Na is most preferable. This is because these metals are lightweight and enable the formation of a high-voltage secondary cell.

Examples of the substance serving as the anion X of the alkali metal salt used in the electrolytic solution according to one aspect of the present invention include $Cl^-$, $Br^-$, $I^-$, $BF_4^-$, $PF_6^-$, $CF_3SO_3^-$, $ClO_4^-$, $CF_3CO_2^-$, $AsF_6^-$, $SbF_6^-$, $AlCl_4^-$, $N(CF_3SO_2)_2^-$, $N(FSO_2)_2^-$, $N(CF_3CF_2SO_2)_2^-$, $N(SO_2-CF_2CF_2SO_2-)^-$, and $N[(CF_3SO_2)(FSO_2)]^-$. In terms of the chemical stability, $BF_4^-$, $PF_6^-$, $ClO_4^-$, $N(CF_3SO_2)_2^-$, $N(FSO_2)_2^-$, $N(CF_3CF_2SO_2)_2^-$, $N(SO_2-CF_2CF_2SO_2-)^-$, and $N[(CF_3SO_2)(FSO_2)]^-$ are preferable. In terms of the solubility in the glyme solvent, $N(CF_3SO_2)_2^-$, $N(FSO_2)_2^-$, $N(CF_3CF_2SO_2)_2^-$, $N(SO_2-CF_2CF_2SO_2-)^-$, and $N[(CF_3SO_2)(FSO_2)]^-$ are more preferable. The alkali metal salts as mentioned above may be used alone or as a mixture of two or more thereof.

When n is an integer of 2 to 4 in the formula (2), the glyme solvent may be contained in an amount of about 1 mol, specifically in an amount of 0.95 mol or more and 1.05 mol or less, per mol of the alkali metal salt. When n is 1, the glyme solvent may be contained in an amount of about 2 mol, specifically in an amount of 1.95 mol or more and 2.05 mol or less, per mol of the alkali metal salt. With the amount of the glyme solvent being in such a range, the solubility of the alkali metal salt can be held sufficient even when a phosphazene is used as a main solvent.

The solvent component included in the non-aqueous electrolytic solution according to one aspect of the present invention may essentially consist of the glyme solvent and the phosphazene solvent. In this case, the fact that the phosphazene solvent is contained provides excellent flame retardancy. Additionally, the fact that the glyme solvent is contained provides sufficient dissolution of the alkali metal salt and high ion conductivity and, at the same time, leads to excellent oxidation resistance of the non-aqueous electrolytic solution. This can contribute to the charge/discharge reaction of an active material capable of yielding a high voltage as high as about 4 V.

The solvent component of the non-aqueous electrolytic solution according to one aspect of the present invention may further include another non-aqueous solvent in addition to the glyme solvent and the phosphazene solvent. As the other non-aqueous solvent, there may be contained a solvent commonly known to be used in non-aqueous electrolytic solutions. Specific examples of the other non-aqueous solvent include cyclic or chain carbonates, cyclic or chain carbonate esters, cyclic or chain esters, cyclic or chain ethers, nitriles, and amides. For example, the non-aqueous electrolytic solution of the present embodiment may further include at least one selected from the group consisting of a carbonate solvent and an ester solvent.

Second Embodiment

Hereinafter, an embodiment of the alkali metal secondary cell according to one aspect of the present invention will be more specifically described with reference to the drawing. FIG. 1 is a schematic cross-sectional view showing an example of the configuration of the alkali metal secondary cell of the present embodiment.

FIG. 1 shows a schematic configuration of the alkali metal secondary cell of the present embodiment. A positive electrode 13 is composed of a positive electrode current collector 11 and a positive electrode composite layer 12 formed on the positive electrode current collector 11. A negative electrode 16 is composed of a negative electrode current collector 14 and a negative electrode composite layer 15 formed on the negative electrode current collector 14. The positive electrode 13 and the negative electrode 16 face each other across a separator 17. These components are enclosed by a covering material 18 so that a cell is formed.

The positive electrode composite layer 12 contains a positive electrode active material capable of absorbing and releasing an alkali metal ion, and may, as necessary, contain a conductive additive, an ion conductor, and/or a binder in addition to the positive electrode active material.

The following describes examples of the positive electrode active material. When the alkali metal is lithium, a commonly-known positive electrode active material capable of absorbing and releasing lithium ions can be used; specifically, a transition metal oxide, a lithium-containing transition metal oxide, or the like, can be used. More specifically, there is used an oxide of cobalt, an oxide of nickel, an oxide of manganese, an oxide of vanadium typified by vanadium pentoxide ($V_2O_5$), a mixture or composite of these oxides, or the like. Composite oxides, such as lithium cobalt oxide ($LiCoO_2$), which contain lithium and a transition metal are best known as positive electrode active materials. Transition metal silicates, transition metal phosphates typified by lithium iron phosphate ($LiFePO_4$), etc., can also be used.

When the alkali metal is sodium, a commonly-known positive electrode active material capable of absorbing and releasing sodium ions can be used. Specifically, a transition metal oxide, a sodium-containing transition metal oxide, or the like, can be used. More specifically, there is used an oxide of cobalt, an oxide of nickel, an oxide of manganese, an oxide of vanadium typified by vanadium pentoxide ($V_2O_5$), a mixture or composite of these oxides, or the like. Composite oxides, such as sodium manganate ($NaMnO_2$), which contain sodium and a transition metal are best known as positive electrode active materials. Transition metal silicates, transition metal phosphates, etc., can also be used.

The conductive additive and the ion conductor are used to reduce the electrode resistance. Examples of the conductive additive include: carbon materials such as carbon black, graphite, and acetylene black; and electrically-conductive polymers such as polyaniline, polypyrrole, and polythiophene. Examples of the ion conductor include gel electrolytes such as polymethylmethacrylate and polymethylmethacrylate and solid electrolytes such as polyethylene oxide.

The binder is used to improve the bond strength between the materials constituting the electrode. Specific examples of the binder include polyvinylidene fluoride, vinylidene fluoride-hexafluoropropylene copolymer, vinylidene fluoride-tetrafluoroethylene copolymer, polytetrafluoroethylene, carboxymethyl cellulose, polyacrylic acid, styrene-butadiene copolymer rubber, polypropylene, polyethylene, and polyimide.

As the positive electrode current collector 11, there can be used a porous or non-porous sheet or film made of a metal material such as aluminum, stainless steel, titanium, and an alloy thereof. Aluminum and its alloy are preferable because they are inexpensive and easy to form into a thin film. As the sheet or a film, there is used a metal foil, a mesh, or the like. In order to reduce the resistance value, provide a catalytic effect, and strengthen the bonding between the positive electrode composite layer 12 and the positive electrode current collector 11, a carbon material such as carbon may be applied to the surface of the positive electrode current collector 11.

The negative electrode composite layer 12 contains a negative electrode active material capable of absorbing and releasing an alkali metal ion, and may, as necessary, contain a conductive additive, an ion conductor and/or a binder in addition to the negative electrode active material. An ion conductor and/or a binder may be contained. As the conductive additive, the ion conductor, and the binder, there can be used the same materials as those used in the positive electrode.

The following describes examples of the negative electrode active material. When the alkali metal is lithium, the negative electrode active material is not particularly limited as long as it is a commonly-known material capable of absorbing and releasing lithium ions. For example, a lithium metal alone, a lithium metal alloy, a carbon material, a metal oxide, or the like, can be used. As the carbon material, there can be used, for example, graphite or a non-graphite carbon such as hard carbon and coke. As the metal oxide, there can be used, for example, lithium titanate represented by $Li_4Ti_5O_{12}$. As the lithium metal alloy, there can be used an alloy of lithium with a silicon compound, a tin compound, or an aluminum compound.

When the alkali metal is sodium, the negative electrode active material is not particularly limited as long as it is a commonly-known material capable of absorbing and releasing sodium ions. For example, a sodium metal alone, a sodium metal alloy, a carbon material, a metal oxide, or the like, can be used. As the carbon material, there can be used, for example, graphite or non-graphite carbon such as hard carbon and coke. As the metal oxide, there can be used, for example, sodium titanate represented by $Na_2Ti_3O_7$. As the sodium metal alloy, there can be used an alloy of lithium with a tin compound, a germanium compound, a zinc compound, a bismuth compound, an indium compound, or the like.

As the negative electrode current collector 14, there can be used a porous or non-porous sheet or film made of a metal material such as aluminum, stainless steel, nickel, copper, and an alloy thereof. Aluminum and its alloy are preferable because they are inexpensive and easy to form into a thin film. As the sheet or film, there is used a metal foil, a mesh, or the like. In order to reduce the resistance value, provide a catalytic effect, and strengthen the bonding between the negative electrode composite layer 15 and the negative electrode current collector 14, a carbon material such as carbon may be applied to the surface of the negative electrode current collector 14.

As the separator 17, there is used a porous membrane made of polyethylene, polypropylene, glass, cellulose, ceramic or the like. The pores of the porous membrane used is impregnated with the electrolyte.

EXAMPLES

In the following, Examples and Comparative Examples will be given to illustrate non-aqueous electrolytic solutions according to one aspect of the present invention, methods for producing non-aqueous electrolyte secondary cells using the non-aqueous electrolytic solution, and various evaluation results. In all Examples, the non-aqueous electrolytic solutions were prepared in an argon glove box. The embodiments of the present invention are not limited to Examples described hereinafter.

Example 1

Non-aqueous electrolytic solutions were prepared using tetraethylene glycol dimethyl ether ($CH_3$—$(OCH_2CH_2)_4$—$OCH_3$) as the glyme solvent, using as the phosphazene solvent a compound represented by the following formula (3) where the substituent R is an ethyl group, and using lithium bis(trifluoromethylsulfonyl)imide (LiN($CF_3CF_2SO_2$)$_2$) as the alkali metal salt.

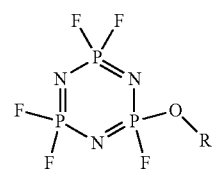

(3)

First, the above glyme solvent and alkali metal salt were mixed at a molar ratio of 1:1 to dissolve the alkali metal salt in the glyme solvent. Next, the phosphazene solvent was mixed with the thus-prepared solution in proportions such that the volume ratios of the phosphazene solvent to the total volume of the glyme solvent and the phosphazene solvent (total solvent volume) were 16%, 29%, 42%, 52%, 54%, 62%, 71%, 79%, and 88%. Thus, non-aqueous electrolytic solution samples 1 to 9 were obtained.

In non-aqueous electrolytic solution samples 1 to 9, the amount of the glyme solvent per mol of the alkali metal salt was 1 mol.

Example 2

Non-aqueous electrolytic solutions were prepared in the same manner as in Example 1, except for using triethylene glycol dimethyl ether ($CH_3$—($OCH_2CH_2$)$_3$—$OCH_3$) as the glyme solvent. The non-aqueous electrolytic solutions of Example 2 were used as samples 12 to 19, in which the volume ratios of the phosphazene solvent to the total solvent volume were 28%, 37%, 46%, 55%, 64%, 73%, 82%, and 91%, respectively. In non-aqueous electrolytic solution samples 12 to 19, the amount of the glyme solvent per mol of the alkali metal salt was 1 mol.

Example 3

A non-aqueous electrolytic solution was prepared in the same manner as in Example 1, except for using diethylene glycol dimethyl ether ($CH_3$—($OCH_2CH_2$)$_3$—$OCH_3$) as the glyme solvent. The non-aqueous electrolytic solution of Example 3 was used as sample 22, in which the volume ratio of the phosphazene solvent to the total solvent volume was 80%. In non-aqueous electrolytic solution sample 22, the amount of the glyme solvent per mol of the alkali metal salt was 1 mol.

Example 4

Non-aqueous electrolytic solutions were prepared in the same manner as in Example 1, except for using monoethylene glycol dimethyl ether ($CH_3$—($OCH_2CH_2$)$_1$—$OCH_3$) as the glyme solvent and mixing the glyme solvent and the alkali metal salt at a molar ratio of 2:1 to dissolve the alkali metal salt in the glyme solvent. The non-aqueous electrolytic solutions of Example 4 were used as samples 24 to 32, in which the volume ratios of the phosphazene solvent to the total solvent volume were 7%, 17%, 27%, 38%, 48%, 58%, 69%, 79%, and 89%, respectively. In non-aqueous electrolytic solution samples 24 to 32, the amount of the glyme solvent per mol of the alkali metal salt was 2 mol.

Example 5

Non-aqueous electrolytic solutions were prepared in the same manner as in Example 4, except for using lithium bis(fluorosulfonyl)imide ($LiN(FSO_2)_2$) as the alkali metal salt. The non-aqueous electrolytic solutions of Example 5 were used as samples 35 to 43, in which the volume ratios of the phosphazene solvent to the total solvent volume were 7%, 17%, 27%, 38%, 48%, 58%, 69%, 79%, and 90%, respectively. In non-aqueous electrolytic solution samples 35 to 43, the amount of the glyme solvent per mol of the alkali metal salt was 2 mol.

Example 6

A non-aqueous electrolytic solution was prepared in the same manner as in Example 2, except for using, as the alkali metal salt, a mixture of lithium bis(fluoromethylsulfonyl)imide ($LiN(CF_3SO_2)_2$) and lithium bis(fluorosulfonyl)imide ($LiN(FSO_2)_2$) at a molar ratio of 1:1. The non-aqueous electrolytic solution of Example 6 was used as sample 46, in which the volume ratio of the phosphazene solvent to the total solvent volume was 82%. In non-aqueous electrolytic solution sample 46, the amount of the glyme solvent per mol of the alkali metal mixed salt was 1 mol.

Example 7

A non-aqueous electrolytic solution was prepared in the same manner as in Example 2, except for using, as the alkali metal salt, a mixture of lithium bis(fluoromethylsulfonyl)imide ($LiN(CF_3SO_2)_2$) and lithium hexafluorophosphate ($LiPF_6$) at a molar ratio of 0.95:0.05. The non-aqueous electrolytic solution of Example 7 was used as sample 48, in which the volume ratio of the phosphazene solvent to the total solvent volume was 82%. In non-aqueous electrolytic solution sample 48, the amount of the glyme solvent per mol of the alkali metal mixed salt was 1 mol.

Example 8

A non-aqueous electrolytic solution was prepared in the same manner as in Example 4, except for using sodium bis(trifluoromethylsulfonyl)imide ($NaN(CF_3SO_2)_2$) as the alkali metal salt. The non-aqueous electrolytic solution of Example 8 was used as sample 50, in which the volume ratio of the phosphazene solvent to the total solvent volume was 79%. In non-aqueous electrolytic solution sample 50, the amount of the glyme solvent per mol of the alkali metal salt was 2 mol.

Example 9

A non-aqueous electrolytic solution was prepared in the same manner as in Example 8, except for using sodium bis(fluorosulfonyl)imide ($NaN(FSO_2)_2$) as the alkali metal salt. The non-aqueous electrolytic solution of Example 9 was used as sample 52, in which the volume ratio of the phosphazene solvent to the total solvent volume was 79%. In non-aqueous electrolytic solution sample 52, the amount of the glyme solvent per mol of the alkali metal salt was 2 mol.

Comparative Example 1

Non-aqueous electrolytic solution sample 10 was prepared in the same manner as in Example 1, except that no phosphazene solvent was contained. In non-aqueous electrolytic solution of Comparative Example 1, the volume ratio of the phosphazene solvent to the total solvent volume was 0%, and the amount of the glyme solvent per mol of the alkali metal salt was 1 mol.

Comparative Example 2

Non-aqueous electrolytic solution sample 11 was prepared in the same manner as in Example 1, except that no glyme solvent was contained. In the non-aqueous electrolytic solution of Comparative Example 2, the volume ratio of the phosphazene solvent to the total solvent volume was 100%. In this case, the alkali metal salt was mixed in an amount to give a concentration of 1 mol/L.

Comparative Example 3

Non-aqueous electrolytic solution sample 20 was prepared in the same manner as in Example 2, except that no phosphazene solvent was contained. In the non-aqueous electrolytic solution of Comparative Example 20, the volume ratio of the phosphazene solvent to the total solvent volume was 0%, and the amount of the glyme solvent per mol of the alkali metal salt was 1 mol.

Comparative Example 4

Non-aqueous electrolytic solution sample 21 was prepared in the same manner as in Example 2, except that no glyme solvent was contained. In the non-aqueous electrolytic solution of Comparative Example 4, the volume ratio of the phosphazene solvent to the total solvent volume was 100%. In this case, the alkali metal salt was mixed in an amount to give a concentration of 1 mol/L.

Comparative Example 5

Non-aqueous electrolytic solution sample 23 was prepared in the same manner as in Example 3, except that no glyme solvent was contained. In the non-aqueous electrolytic solution of Comparative Example 5, the volume ratio of the phosphazene solvent to the total solvent volume was 100%. In this case, the alkali metal salt was mixed in an amount to give a concentration of 1 mol/L.

Comparative Example 6

Non-aqueous electrolytic solution sample 33 was prepared in the same manner as in Example 4, except that no phosphazene solvent was contained. In the non-aqueous electrolytic solution of Comparative Example 6, the volume ratio of the phosphazene solvent to the total solvent volume was 0%, and the amount of the glyme solvent per mol of the alkali metal salt was 2 mol.

Comparative Example 7

Non-aqueous electrolytic solution sample 34 was prepared in the same manner as in Example 4, except that no glyme solvent was contained. In the non-aqueous electrolytic solution of Comparative Example 7, the volume ratio of the phosphazene solvent to the total solvent volume was 100%. In this case, the alkali metal salt was mixed in an amount to give a concentration of 1 mol/L.

Comparative Example 8

Non-aqueous electrolytic solution sample 44 was prepared in the same manner as in Example 5, except that no phosphazene solvent was contained. In the non-aqueous electrolytic solution of Comparative Example 8, the volume ratio of the phosphazene solvent to the total solvent volume was 0%, and the amount of the glyme solvent per mol of the alkali metal salt was 2 mol.

Comparative Example 9

Non-aqueous electrolytic solution sample 45 was prepared in the same manner as in Example 5, except that no glyme solvent was contained. In the non-aqueous electrolytic solution of Comparative Example 9, the volume ratio of the phosphazene solvent to the total solvent volume was 100%. In this case, the alkali metal salt was mixed in an amount to give a concentration of 1 mol/L.

Comparative Example 10

Non-aqueous electrolytic solution sample 47 was prepared in the same manner as in Example 6, except that no glyme solvent was contained. In the non-aqueous electrolytic solution of Comparative Example 10, the volume ratio of the phosphazene solvent to the total solvent volume was 100%. In this case, the alkali metal mixed salt was mixed in an amount to give a concentration of 1 mol/L.

Comparative Example 11

Non-aqueous electrolytic solution sample 49 was prepared in the same manner as in Example 7, except that no glyme solvent was contained. In the non-aqueous electrolytic solution of Comparative Example 11, the volume ratio of the phosphazene solvent to the total solvent volume was 100%. In this case, the alkali metal mixed salt was mixed in an amount to give a concentration of 1 mol/L.

Comparative Example 12

Non-aqueous electrolytic solution sample 51 was prepared in the same manner as in Example 8, except that no glyme solvent was contained. In the non-aqueous electrolytic solution of Comparative Example 12, the volume ratio of the phosphazene solvent to the total solvent volume was 100%. In this case, the alkali metal salt was mixed in an amount to give a concentration of 1 mol/L.

Comparative Example 13

Non-aqueous electrolytic solution sample 53 was prepared in the same manner as in Example 9, except that no glyme solvent was contained. In the non-aqueous electrolytic solution of Comparative Example 13, the volume ratio of the phosphazene solvent to the total solvent volume was 100%. In this case, the alkali metal salt was mixed in an amount to give a concentration of 1 mol/L.

Comparative Example 14

In Comparative Example 14, non-aqueous electrolytic solutions containing propylene carbonate as a carbonate solvent instead of the glyme solvent of Example 1 were prepared using the same phosphazene solvent and alkali metal salt as those of Example 1.

First, the propylene carbonate and the phosphazene solvent were mixed in proportions such that the volume ratios of the phosphazene solvent to the total volume of the propylene carbonate and the phosphazene solvent (total solvent volume) were 0%, 10%, 20%, 30%, 40%, 50%, 60%, 70%, 80%, 90%, and 100%. Next, the alkali metal salt was mixed with each of the obtained mixed solutions to give a concentration of 1 mol/L. Thus, non-aqueous electrolytic solution samples 54 to 64 of Comparative Example 14 were obtained.

The fact that the volume ratio of the phosphazene solvent to the total volume of the propylene carbonate and the phosphazene solvent is 0% means that the phosphazene solvent is not contained at all, while the fact that the volume ratio is 100% means that the propylene carbonate is not contained at all.

[Evaluation of Compatibility and Electrical Conductivity]

The compatibility of each of the non-aqueous electrolytic solutions of Examples 1 to 9 and Comparative Examples 1 to 14 was evaluated by visual inspection. For the solutions in which the non-aqueous solvents were homogeneous, electrical conductivity measurement was performed. When the precipitation of the alkali metal salt or the phase separation between the solvents was observed, the "compatibility" was considered "poor", while when these phenomena were not observed, the "compatibility" was considered "good".

The measurement of the electrical conductivity was performed at 25° C. using D-54 pH/Conductivity Meter manufactured by HORIBA, Ltd. The results for Examples 1 to 9 and Comparative Examples 1 to 13 are shown in Tables 1-1 and 1-2, and the results for Comparative Example 14 are shown in Table 2.

TABLE 1-1

|  |  | Volume Ratio of Phosphazene Solvent [%] | Evaluation Result | |
|---|---|---|---|---|
|  |  |  | Compat-ibility | Electrical Conductivity [mS/cm] |
| Comp. Example 1 | Sample 10 | 0 | Good | 1.8 |
| Example 1 | Sample 1 | 16 | Good | 2.4 |
|  | Sample 2 | 29 | Good | 2.9 |
|  | Sample 3 | 42 | Good | 3.4 |
|  | Sample 4 | 52 | Good | 3.7 |
|  | Sample 5 | 54 | Good | 3.8 |
|  | Sample 6 | 62 | Good | 3.7 |
|  | Sample 7 | 71 | Good | 3.4 |
|  | Sample 8 | 79 | Good | 2.8 |
|  | Sample 9 | 88 | Good | 1.9 |
| Comp. Example 2 | Sample 11 | 100 | Poor | — |
| Comp. Example 3 | Sample 20 | 0 | Good | 1.1 |
| Example 2 | Sample 12 | 28 | Good | 1.6 |
|  | Sample 13 | 37 | Good | 1.8 |
|  | Sample 14 | 46 | Good | 1.9 |
|  | Sample 15 | 55 | Good | 1.9 |
|  | Sample 16 | 64 | Good | 2.0 |
|  | Sample 17 | 73 | Good | 1.7 |
|  | Sample 18 | 82 | Good | 1.4 |
|  | Sample 19 | 91 | Good | 0.9 |
| Comp. Example 4 | Sample 21 | 100 | Poor | — |
| Example 3 | Sample 22 | 80 | Good | 0.9 |
| Comp. Example 5 | Sample 23 | 100 | Poor | — |
| Comp. Example 6 | Sample 33 | 0 | Good | 3.6 |
| Example 4 | Sample 24 | 7 | Good | 4.0 |
|  | Sample 25 | 17 | Good | 4.3 |
|  | Sample 26 | 27 | Good | 4.6 |
|  | Sample 27 | 38 | Good | 4.3 |
|  | Sample 28 | 48 | Good | 4.0 |
|  | Sample 29 | 58 | Good | 3.7 |
|  | Sample 30 | 69 | Good | 2.9 |
|  | Sample 31 | 79 | Good | 1.8 |
|  | Sample 32 | 89 | Good | 1.1 |
| Comp. Example 7 | Sample 34 | 100 | Poor | — |

TABLE 1-2

|  |  | Volume Ratio of Phosphazene Solvent [%] | Evaluation Result | |
|---|---|---|---|---|
|  |  |  | Compat-ibility | Electrical Conductivity [mS/cm] |
| Comp. Example 8 | Sample 44 | 0 | Good | 8.7 |
| Example 5 | Sample 35 | 7 | Good | 9.5 |
|  | Sample 36 | 17 | Good | 9.9 |
|  | Sample 37 | 27 | Good | 9.8 |
|  | Sample 38 | 38 | Good | 8.8 |
|  | Sample 39 | 48 | Good | 7.6 |
|  | Sample 40 | 58 | Good | 6.2 |
|  | Sample 41 | 69 | Good | 5.0 |
|  | Sample 42 | 79 | Good | 2.8 |
|  | Sample 43 | 90 | Good | 1.5 |
| Comp. Example 9 | Sample 45 | 100 | Poor | — |
| Example 6 | Sample 46 | 82 | Good | 1.8 |
| Comp. Example 10 | Sample 47 | 100 | Poor | — |
| Example 7 | Sample 48 | 82 | Good | 1.3 |
| Comp. Example 11 | Sample 49 | 100 | Poor | — |
| Example 8 | Sample 50 | 79 | Good | 1.3 |
| Comp. Example 12 | Sample 51 | 100 | Poor | — |
| Example 9 | Sample 52 | 79 | Good | 1.7 |
| Comp. Example 13 | Sample 53 | 100 | Poor | — |

TABLE 2

|  |  | Volume Ratio of Phosphazene Solvent [%] | Evaluation Result | |
|---|---|---|---|---|
|  |  |  | Compat-ibility | Electrical Conductivity [mS/cm] |
| Comp. Example 14 | Sample 54 | 0 | Good | 6.9 |
|  | Sample 55 | 10 | Good | 6.2 |
|  | Sample 56 | 20 | Good | 5.5 |
|  | Sample 57 | 30 | Good | 4.8 |
|  | Sample 58 | 40 | Poor | — |
|  | Sample 59 | 50 | Poor | — |
|  | Sample 60 | 60 | Poor | — |
|  | Sample 61 | 70 | Poor | — |
|  | Sample 62 | 80 | Poor | — |
|  | Sample 63 | 90 | Poor | — |
|  | Sample 64 | 100 | Poor | — |

As shown in Tables 1-1 and 1-2, for the non-aqueous electrolytic solutions of Examples 1 to 9 of the present invention which contained an alkali metal salt, a glyme solvent, and a phosphazene solvent, neither the phase separation between the solvents nor the precipitation of the alkali metal salt was observed; that is, the non-aqueous electrolytic solutions were successfully obtained, with the solvents being homogeneous. For the non-aqueous electrolytic solutions according to one aspect of the present invention which contained the glyme solvent and the phosphazene solvent, homogeneous mixing was successfully achieved over a wide composition range in which the volume ratio of the phosphazene was 16% to 91%. By contrast, in the case of the non-aqueous solvents of Comparative Examples 2, 4, 5, 7, and 9 to 13 containing no glyme solvent, the alkali metal salt was not dissolved, but remained as a large amount of precipitate in the bottom portion of the solvent. Thus, it was confirmed that the glyme solvent functions to dissolve the alkali metal salt.

Additionally, the non-aqueous electrolytic solutions based on the material system of Example 1 of the present invention showed high values of electrical conductivity ranging from 1.9 to 3.8 mS/cm when the volume ratio of the phosphazene solvent was 16% or more and 88% or less, and the values of the electrical conductivity were higher than that for the non-aqueous electrolytic solution of Comparative Example 1 based on the same material system except for containing no phosphazene solvent.

Additionally, the non-aqueous electrolytic solutions based on the material system of Example 2 of the present invention showed high values of electrical conductivity ranging from 1.4 to 2.0 mS/cm when the volume ratio of the phosphazene solvent was 28% or more and 82% or less, and the values of the electrical conductivity were higher than that for the non-aqueous electrolytic solution of Comparative Example 3 based on the same material system except for containing no phosphazene solvent. The non-aqueous electrolytic solutions based on the material system of Example 4 of the present invention showed high values of electrical conductivity ranging from 3.7 to 4.6 mS/cm when the volume ratio of the phosphazene solvent was 7% or more and 58% or less, and the values of the electrical conductivity were higher than that for the non-aqueous electrolytic solution of Comparative Example 6 based on the same material system except for containing no phosphazene solvent.

Additionally, the non-aqueous electrolytic solutions based on the material system of Example 5 of the present invention showed high values of electrical conductivity ranging from 8.8 to 9.9 mS/cm when the volume ratio of the phosphazene solvent was 7% or more and 38% or less, and the values of the electrical conductivity were higher than that for the non-aqueous electrolytic solution of Comparative Example 8 based on the same material system except for containing no phosphazene solvent.

This result demonstrates that the ion conducting performance can be improved by setting the ratio of the amount of the phosphazene included in the non-aqueous solvents to an appropriate range.

As shown in Table 2, for the non-aqueous electrolytic solutions of samples 54 to 57 of Comparative Example 14 containing an alkali metal salt, a carbonate ester solvent, and a phosphazene solvent, neither the phase separation between the solvents nor the precipitation of the alkali metal salt was observed; that is, the non-aqueous electrolytic solutions were successfully obtained, with the solvents being homogeneous. By contrast, for the non-aqueous electrolytic solutions of samples 58 to 64, the phase separation between the solvents was observed, which means that the non-aqueous electrolytic solutions were not obtained in the form of homogeneous solutions. That is, for a non-aqueous electrolytic solution containing a carbonate ester solvent and a phosphazene solvent, homogeneous mixing was successfully achieved when the volume ratio of the phosphazene was not more than 30%, but not when the volume ratio of the phosphazene was 40% or more.

Comparison of Tables 1-1, 1-2, and 2 confirms that the non-aqueous electrolytic solutions according to one aspect of the present invention which contained a phosphazene solvent and a glyme solvent were superior to non-aqueous solvents including a phosphazene solvent and a carbonate ester solvent in terms of the width of the range of the mixing ratio of the phosphazene solvent.

Additionally, the non-aqueous electrolytic solutions containing a phosphazene solvent and a carbonate ester solvent showed a behavior in which the electrical conductivity decreases with increase in the volume ratio of the phosphazene. This indicates that there is a trade-off relationship in which a higher content of the phosphazene provides better flame retardancy but leads to lower electrical conducting performance.

By contrast, the non-aqueous electrolytic solutions according to one aspect of the present invention showed a distinctively different behavior. Specifically, the non-aqueous electrolytic solutions of Example 1 of the present invention showed values of the electrical conductivity ranging from 1.9 to 3.8 mS/cm, and it was confirmed that the fact that the phosphazene was contained provided an increased electrical conductivity higher than an electrical conductivity of 1.8 mS/cm shown by Comparative Example 1 containing no phosphazene solvent. This result indicates a trend that a higher content of the phosphazene provides better flame retardancy and, at the same time, offers higher electrical conducting performance. In this respect, the non-aqueous electrolytic solutions according to one aspect of the present invention can be said to be distinctively different from the carbonate ester-containing non-aqueous electrolytic solutions. Furthermore, the fact that homogeneous mixing can be achieved at an arbitrary volume ratio of the phosphazene suggests that a non-aqueous electrolytic solution can be freely designed by appropriately adjusting the ratio between the glyme solvent and the phosphazene solvent as a function of the required electrical conductivity or flame retardancy varying depending on the intended use.

[Evaluation of Thermal Stability]

Thermal stability of each of the non-aqueous electrolytic solutions according to one aspect of the present invention was evaluated. Thermal stability evaluation was performed by calorimetry using a differential scanning calorimeter, DSC-6200 manufactured by Seiko Instrument Inc.

In a hermetically-sealed container made of stainless steel, there were enclosed $Li_{0.42}CoO_2$ in a charged state and 0.1 μL of the non-aqueous electrolytic solution sample. The temperature was increased from room temperature to 600° C. at a temperature increase rate of 10° C./min under Ar gas flow of 30 cc/min. Exothermic peaks obtained during the temperature increase from room temperature to 600° C. were integrated, and the amount of generated heat was evaluated.

The results of the thermal stability evaluation performed on samples 5 and 8 of Example 1, sample 10 of Comparative Example 1, and samples 54 and 57 of Comparative Example 14 are collectively shown in Table 3.

TABLE 3

| | | Solvent Composition | | |
| --- | --- | --- | --- | --- |
| | | Solvent other than Phosphazene Solvent | Volume Ratio of Phosphazene Solvent [%] | Amount of Generated Heat [mJ] |
| Comp. Example 1 | Sample 10 | Tetraglyme | 0 | 376 |
| Example 1 | Sample 5 | Tetraglyme | 54 | 277 |
| | Sample 8 | | 79 | 181 |
| Comp. Example 14 | Sample 54 | Propylene Carbonate | 0 | 607 |
| | Sample 57 | | 30 | 303 |

Non-aqueous electrolytic solution sample 57 of Comparative Example 14 in Table 3 is a non-aqueous electrolytic solution containing the phosphazene solvent at a volume ratio of 30% which is an upper limit of the range of volume ratios over which homogeneous mixing is possible. In the case of non-aqueous electrolytic solution sample 57, the amount of heat was controlled to a low value of 303 mJ, which was about half of that for sample 54 containing no phosphazene. As for the non-aqueous electrolytic solution samples of Example 1 of the present invention, sample 5 containing the phosphazene solvent at a volume ratio of 54% showed an amount of heat of 277 mJ, and sample 8 containing the phosphazene solvent at a volume ratio of 79% showed an amount of heat of 181 mJ; that is, it was confirmed that in the non-aqueous electrolytic solution samples of Example 1, the amount of heat was controlled to be smaller than those in Comparative Example 14. It was further confirmed that also in the non-aqueous electrolytic solution samples of Examples 2 to 9, the amount of heat was controlled to be small.

Comparison of samples 10, 5, and 8 reveals that the amount of generated heat can be controlled by adjusting the amount of the phosphazene solvent to be mixed. In the non-aqueous electrolytic solution according to one aspect of the present invention, the ratio of the amount of the phosphazene solvent added can be arbitrary. This means that a non-aqueous electrolytic solution can be designed depending on the intended use and hence that the flexibility in designing a cell can be increased. Increasing the ratio of the amount of the added phosphazene solvent as compared with the case of conventional non-aqueous electrolytic solutions makes it possible to provide a non-aqueous electrolytic solution superior in safety to the conventional ones.

Example 10

Non-aqueous electrolytic solutions were prepared by the same procedures as in Example 1, using tetraethylene glycol dimethyl ether ($CH_3$—$(OCH_2CH_2)_4$—$OCH_3$) as the glyme solvent, using as the phosphazene solvent a compound represented by the following formula (3) where the substituent R is a phenyl group, and using lithium bis(trifluoromethylsulfonyl)imide ($LiN(CF_3CF_2SO_2)_2$) as the alkali metal salt.

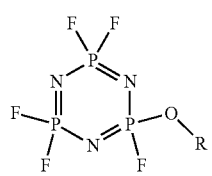

(3)

The above glyme solvent and alkali metal salt were mixed at a molar ratio of 1:1 to dissolve the alkali metal salt in the glyme solvent. Next, the phosphazene solvent was mixed with the thus-prepared solution in proportions such that the volume ratios of the phosphazene solvent to the total volume of the glyme solvent and the phosphazene solvent were 16%, 29%, 42%, 52%, 54%, 62%, 71%, 79%, and 88%. Thus, non-aqueous electrolytic solution samples 65 to 73 were obtained. The preparation of the non-aqueous electrolytic solutions was performed in an argon glove box.

In non-aqueous electrolytic solution samples 65 to 73, the amount of the glyme solvent per mol of the alkali metal salt was 1 mol.

Comparative Example 15

Non-aqueous electrolytic solution sample 74 was prepared in the same manner as in Example 10, except that no phosphazene solvent was contained. In the non-aqueous electrolytic solution of Comparative Example 15, the volume ratio of the phosphazene solvent to the total solvent volume was 0%, and the amount of the glyme solvent per mol of the alkali metal salt was 1 mol.

Comparative Example 16

Non-aqueous electrolytic solution sample 75 was prepared in the same manner as in Example 10, except that no glyme solvent was contained. In the non-aqueous electrolytic solution of Comparative Example 16, the volume ratio of the phosphazene solvent to the total solvent volume was 100%. In this case, the alkali metal salt was mixed in an amount to give a concentration of 1 mol/L.

Comparative Example 17

In Comparative Example 17, non-aqueous electrolytic solutions were prepared using the same phosphazene solvent and alkali metal salt as those of Example 10 and using propylene carbonate as a carbonate solvent instead of the glyme solvent.

First, the propylene carbonate and the phosphazene solvent were mixed in proportions such that the volume ratios of the phosphazene solvent to the total volume of the propylene carbonate and the phosphazene solvent were 0%, 10%, 20%, 30%, 40%, 50%, 60%, 70%, 80%, 90%, and 100%. Next, the alkali metal salt was mixed with each of the obtained mixed solutions to give a concentration of 1 mol/L. Thus, non-aqueous electrolytic solution samples 76 to 86 of Comparative Example 17 were obtained. The preparation of the non-aqueous electrolytic solutions was performed in an argon glove box.

[Evaluation of Compatibility and Electrical Conductivity]

The compatibility of each of the non-aqueous electrolytic solutions of Example 10 and Comparative Examples 15 to 17 was evaluated by visual inspection. For the solutions in which the non-aqueous solvents were homogeneous, electrical conductivity measurement was performed. The measurement of the electrical conductivity was performed at 25° C. using D-54 pH/Conductivity Meter manufactured by HORIBA, Ltd. The results for Example 2 and Comparative Examples 15 to 16 are shown in Table 4, and the results for Comparative Example 17 are shown in Table 5.

TABLE 4

| | | Volume Ratio of Phosphazene Solvent [%] | Evaluation Result | |
|---|---|---|---|---|
| | | | Compat-ibility | Electrical Conductivity [mS/cm] |
| Comp. Example 15 | Sample 74 | 0 | Good | 1.8 |
| Example 10 | Sample 65 | 16 | Good | 2.1 |
| | Sample 66 | 29 | Good | 2.2 |
| | Sample 67 | 42 | Good | 2.4 |
| | Sample 68 | 52 | Good | 2.2 |
| | Sample 69 | 54 | Good | 2.2 |
| | Sample 70 | 62 | Good | 2.1 |
| | Sample 71 | 71 | Good | 1.7 |
| | Sample 72 | 79 | Good | 1.2 |
| | Sample 73 | 88 | Good | 0.5 |
| Comp. Example 16 | Sample 75 | 100 | Poor | — |

TABLE 5

| | | Volume Ratio of Phosphazene Solvent [%] | Evaluation Result | |
|---|---|---|---|---|
| | | | Compat-ibility | Electrical Conductivity [mS/cm] |
| Comp. Example 17 | Sample 76 | 0 | Good | 6.9 |
| | Sample 77 | 10 | Good | 5.4 |
| | Sample 78 | 20 | Good | 4.5 |
| | Sample 79 | 30 | Good | 3.5 |
| | Sample 80 | 40 | Poor | — |

TABLE 5-continued

|  | Volume Ratio of Phosphazene Solvent [%] | Evaluation Result | |
|---|---|---|---|
|  |  | Compatibility | Electrical Conductivity [mS/cm] |
| Sample 81 | 50 | Poor | — |
| Sample 82 | 60 | Poor | — |
| Sample 83 | 70 | Poor | — |
| Sample 84 | 80 | Poor | — |
| Sample 85 | 90 | Poor | — |
| Sample 86 | 100 | Poor | — |

As shown in Table 4, for the non-aqueous electrolytic solutions of Example 10 of the present invention which contained an alkali metal salt, a glyme solvent, and a phosphazene solvent, neither the phase separation between the solvents nor the precipitation of the alkali metal salt was observed; that is, the non-aqueous electrolytic solutions were successfully obtained, with the solvents being homogeneous. For the non-aqueous electrolytic solutions according to one aspect of the present invention which contained the glyme solvent and the phosphazene solvent, homogeneous mixing was successfully achieved over a wide composition range in which the volume ratio of the phosphazene was 16% to 88%. By contrast, in the case of the non-aqueous solvent of Comparative Example 16 containing no glyme solvent, the alkali metal salt was not dissolved, but remained as a large amount of precipitate in the bottom portion of the solvent. Thus, it was confirmed that the glyme solvent functions to dissolve the alkali metal salt. Additionally, the non-aqueous electrolytic solutions of Example 2 of the present invention showed high values of electrical conductivity, the highest of which was 2.4 mS/cm. It was also confirmed that the values of the electrical conductivity were higher than that for Comparative Example 15 containing no phosphazene solvent.

This result demonstrates that, when the non-aqueous solvent according to one aspect of the present invention includes a larger amount of the phosphazene solvent, the ion conducting performance can be improved.

As shown in Table 5, for the non-aqueous electrolytic solutions of samples 76 to 86 of Comparative Example 17 containing an alkali metal salt, a carbonate ester solvent, and a phosphazene solvent, neither the phase separation between the solvents nor the precipitation of the alkali metal salt was observed; that is, the non-aqueous electrolytic solutions were successfully, with the solvents being homogeneous. By contrast, for the non-aqueous electrolytic solutions of samples 80 to 86, the phase separation between the solvents was observed, which means that the non-aqueous electrolytic solutions were not obtained in the form of homogeneous solutions. That is, for a non-aqueous electrolytic solution containing a carbonate ester solvent and a phosphazene solvent, homogeneous mixing was successfully achieved when the volume ratio of the phosphazene was not more than 30%, but not when the volume ratio of the phosphazene was 40% or more.

The volume ratio of the phosphazene solvent to the total solvent volume may be 42% or more and 88% or less. Such volume ratios are those which have been conventionally unacceptable in terms of achieving homogeneous mixing, as is apparent from Comparative Example 14 and Comparative Example 17. With such volume ratios, therefore, an electrolytic solution superior in safety to conventional ones can be provided.

[Evaluation of Thermal Stability]

Thermal stability evaluation was performed also on samples 69 and 72 of Example 10, and it was confirmed that the amount of generated heat in these samples was smaller than that in sample 80 of Comparative Example 17, and showed a similar trend to that in Examples 1 to 9.

The above results for Examples 1 to 10 and Comparative Examples 1 to 17 confirmed that the non-aqueous electrolytic solution according to one aspect of the present invention is independent of the structure of the phosphazene.

Example 11

An example of a lithium secondary cell including a non-aqueous electrolytic solution according to one aspect of the present invention will now be described.

$LiNi_{1/3}Co_{1/3}Mn_{1/3}O_2$ was used as a positive electrode active material. The positive electrode active material, acetylene black as a conductive additive, and polyvinylidene fluoride as a binder were weighed at a weight ratio of 8:1:1, and dispersed in an NMP solvent to prepare a slurry. An Al current collector was coated with the prepared slurry using a coater. The coated collector was flattened by pressure with a mill and then stamped to give a 20 mm×20 mm square piece, which was processed into the form of an electrode. In this manner, a positive electrode was obtained.

A negative electrode was produced by press-bonding lithium metal to a 20 mm×20 mm square nickel mesh. The positive electrode and the negative electrode were opposed to each other across a polyethylene microporous membrane serving as a separator, and thus an electrode assembly having the configuration described for the second embodiment was produced.

The non-aqueous electrolytic solution of sample 5 in Example 1 was used as an electrolytic solution and injected into the electrode assembly, which was then sealed to produce a laminated lithium secondary cell.

Example 12

A lithium secondary cell was produced in exactly the same manner as in Example 11, except that the electrolytic solution used was a different one. In Example 12, the non-aqueous electrolytic solution of sample 8 in Example 1 was used.

Comparative Example 18

A lithium secondary cell was produced in exactly the same manner as in Example 11, except that the electrolytic solution used was a different one. The electrolytic solution used in Comparative Example 18 was a non-aqueous electrolytic solution prepared by dissolving $LiPF_6$ at a concentration of 1 mol/L in a solvent which was a mixture of ethylene carbonate and ethyl methyl carbonate at a volume ratio of 1:3.

[Charge/Discharge Test]

A charge/discharge test was carried out on the lithium secondary cells of Example 11, Example 12, and Comparative Example 18 under the conditions described hereinafter. The charge/discharge test was performed in a constant-temperature chamber at 25° C. The test began with charge, after which there was a 30-minute intermission followed by discharge. This charge/discharge cycle was repeated three times. The charge was constant current/constant voltage charge in which the constant current value was set to give 0.1 C rate based on the theoretical capacity of the positive electrode active material. The maximum charge voltage was set at 4.3 V, and the minimum current value during the constant voltage charge was set at 0.05 C rate. The discharge was performed at 0.1 C rate similarly to the charge, with the minimum discharge voltage set at 3.0 V.

A discharge capacity per 1 g of the positive electrode active material (mAhg$^{-1}$) was calculated for each cell after the three repetitions of the charge/discharge process by converting the discharge capacity measured at the third repetition in which stable charge/discharge process was observed. The obtained values of the capacity are shown in Table 6 below.

TABLE 6

| | Solvent Composition | | |
|---|---|---|---|
| | Solvent other than Phosphazene Solvent | Volume Ratio of Phosphazene Solvent [%] | Discharge Capacity [mAhg$^{-1}$] |
| Comp. Example 18 | Ethylene Carbonate Ethyl Methyl Carbonate | 0 | 161 |
| Example 11 | Tetraglyme | 54 | 155 |
| Example 12 | Tetraglyme | 79 | 157 |

As shown in Table 6, Example 11, Example 12, and Comparative Example 18 all showed similar values ranging from 155 to 161 mAhg$^{-1}$. That is, despite the fact that the non-aqueous electrolytic solutions according to one aspect of the present invention contained a phosphazene solvent as a flame retardant in large amounts, specifically at volume ratios of 54% and 79%, the non-aqueous electrolyte secondary cells using the electrolytic solutions according to the embodiment of the present invention showed a discharge capacity comparable to that in the case of using a conventional carbonate-containing electrolytic solution. This demonstrates that the non-aqueous electrolytic solution of the present invention has sufficient electrochemical stability to withstand the charge/discharge process in cells.

Example 13

A lithium secondary cell was produced in the same manner as in Example 11, except for using LiNiCoAlO$_2$ as the positive electrode active material. In Example 13, the non-aqueous electrolytic solution of sample 8 in Example 1 was used.

Example 14

A lithium secondary cell was produced in exactly the same manner as in Example 13, except that the electrolytic solution used was a different one. In Example 14, the non-aqueous electrolytic solution of sample 18 in Example 2 was used.

Example 15

A lithium secondary cell was produced in exactly the same manner as in Example 13, except that the electrolytic solution used was a different one. In Example 15, the non-aqueous electrolytic solution of sample 22 in Example 3 was used.

Example 16

A lithium secondary cell was produced in exactly the same manner as in Example 13, except that the electrolytic solution used was a different one. In Example 16, the non-aqueous electrolytic solution of sample 31 in Example 4 was used.

Example 17

A lithium secondary cell was produced in exactly the same manner as in Example 13, except that the electrolytic solution used was a different one. In Example 17, the non-aqueous electrolytic solution of sample 42 in Example 5 was used.

Comparative Example 19

A lithium secondary cell was produced in exactly the same manner as in Example 13, except that the electrolytic solution used was a different one. The electrolytic solution used in Comparative Example 19 was a non-aqueous electrolytic solution prepared by dissolving LiPF$_6$ at a concentration of 1 mol/L in a solvent which was a mixture of ethylene carbonate and ethyl methyl carbonate at a volume ratio of 1:3.

[Charge/Discharge Test]

A charge/discharge test was carried out on the lithium secondary cells of Examples 13 to 17 and Comparative Example 19 under the conditions described hereinafter. The charge/discharge test was performed in a constant-temperature chamber at 25° C. The test began with charge, after which there was a 30-minute intermission followed by discharge. This charge/discharge cycle was repeated three times. The charge was constant current charge performed with the current value set to give 0.05 C rate based on the theoretical capacity of the positive electrode active material. The maximum charge voltage was set at 4.3 V, and the minimum discharge voltage was set at 2.5 V. The discharge was performed at 0.05 C rate similarly to the charge. A discharge capacity per 1 g of the positive electrode active material (mAhg$^{-1}$) was calculated for each cell after the three repetitions of the charge/discharge process by converting the discharge capacity measured at the third repetition in which stable charge/discharge process was observed. The obtained values of the capacity are shown in Table 7 below.

TABLE 7

| | Solvent Composition | | |
|---|---|---|---|
| | Solvent other than Phosphazene Solvent | Volume Ratio of Phosphazene Solvent [%] | Discharge Capacity [mAhg$^{-1}$] |
| Comp. Example 19 | Ethylene Carbonate Ethyl Methyl Carbonate | 0 | 206 |
| Example 13 | Tetraglyme | 79 | 201 |
| Example 14 | Triglyme | 82 | 185 |
| Example 15 | Diglyme | 80 | 185 |
| Example 16 | Monoglyme | 79 | 189 |
| Example 17 | Monoglyme | 79 | 203 |

As shown in Table 7, Examples 13 to 17 and Comparative Example 19 all showed similar values ranging from 185 to 206 mAhg$^{-1}$. That is, despite the fact that the non-aqueous electrolytic solutions according to one aspect of the present invention contained a phosphazene solvent as a flame retardant in large amounts, specifically at volume ratios of 79% to 82%, the non-aqueous electrolyte secondary cells using the electrolytic solutions according to the embodiment of the present invention showed a discharge capacity comparable to that in the case of using a conventional carbonate-containing electrolytic solution. This demonstrates that the non-aqueous electrolytic solution of the present invention has sufficient electrochemical stability to withstand the charge/discharge process in cells.

[Discharge Load Test]

A discharge load test was carried out on the lithium secondary cells of Examples 13 to 17 under the conditions described hereinafter. The charge was constant current charge performed with the current value set to give 0.05 C rate based on the theoretical capacity of the positive electrode active material. The maximum charge voltage was set at 4.3 V, and the minimum discharge voltage was set at 2.5 V. The test began with charge, after which there was a 30-minute intermission followed by discharge. This charge/discharge cycle was repeated twice. Thereafter, charge was performed again, and discharge was then performed at 0.2 C rate until the minimum discharge voltage was reached. The capacity retention ratio was calculated for each cell, defining the discharge capacity at 0.05 C rate as 100%. The obtained values of the capacity retention ratio are shown in Table 8 below.

TABLE 8

| | Solvent Composition | |
|---|---|---|
| | Solvent other than Phosphazene Solvent | Volume Ratio of Phosphazene Solvent [%] | Discharge Capacity Retention Ratio [%] |
|---|---|---|---|
| Example 13 | Tetraglyme | 79 | 73 |
| Example 14 | Triglyme | 82 | 76 |
| Example 15 | Diglyme | 80 | 90 |
| Example 16 | Monoglyme | 79 | 92 |
| Example 17 | Monoglyme | 79 | 94 |

As shown in Table 8, both Example 13 and Example 17 showed a retention ratio of not less than 70% even at 0.2 C rate with respect to the discharge capacity at 0.05 C rate. Additionally, Examples 16 and 17 showed retention ratios of 92 and 94%. This demonstrates that the non-aqueous electrolytic solution of the present invention has sufficient electrochemical stability to withstand the charge/discharge process at high discharge currents.

Example 18

An example of a lithium secondary cell including a non-aqueous electrolytic solution according to one aspect of the present invention will now be described.

Natural graphite was used as a negative electrode active material. The negative electrode active material and polyvinylidene fluoride as a binder were weighed at a weight ratio of 9:1, and dispersed in an NMP solvent to prepare a slurry. An Al current collector was coated with the prepared slurry using a coater. The coated collector was flattened by pressure with a mill and then stamped to give a 20 mm×20 mm square piece, which was processed into the form of an electrode. In this manner, a negative electrode was obtained.

A counter electrode was produced by press-bonding lithium metal to a 20 mm×20 mm square nickel mesh. The negative electrode and the counter electrode were opposed to each other across a polyethylene microporous membrane serving as a separator, and thus an electrode assembly having the configuration described for the second embodiment was produced.

The non-aqueous electrolytic solution of sample 18 in Example 2 was used as an electrolytic solution and injected into the electrode assembly, which was then sealed to produce a laminated lithium secondary cell.

Example 19

A lithium secondary cell was produced in exactly the same manner as in Example 18, except that the electrolytic solution used was a different one. In Example 19, the non-aqueous electrolytic solution of sample 46 in Example 6 was used.

Comparative Example 20

A lithium secondary cell was produced in exactly the same manner as in Example 18, except that the electrolytic solution used was a different one. The electrolytic solution used in Comparative Example 20 was a non-aqueous electrolytic solution prepared by dissolving $LiPF_6$ at a concentration of 1 mol/L in a solvent which was a mixture of ethylene carbonate and ethyl methyl carbonate at a volume ratio of 1:3.

[Charge/Discharge Test]

A charge/discharge test was carried out on the lithium secondary cells of Example 18, Example 19, and Comparative Example 20 under the conditions described hereinafter. The charge/discharge test was performed in a constant-temperature chamber at 25° C. The test began with charge, after which there was a 30-minute intermission followed by discharge. This charge/discharge cycle was repeated three times. The charge was constant current/constant voltage charge in which the constant current value was set to give 0.05 C rate based on the theoretical capacity of the negative electrode active material. The minimum charge voltage was set at 0 V, and the minimum current value during the constant voltage charge was set at 0.005 C rate. The discharge was performed at 0.05 C rate similarly to the charge, with the maximum discharge voltage set at 2.0 V. A discharge capacity per 1 g of the negative electrode active material ($mAhg^{-1}$) was calculated for each cell after the three repetitions of the charge/discharge process by converting the discharge capacity measured at the third repetition in which stable charge/discharge process was observed. The obtained values of the capacity are shown in Table 9 below.

TABLE 9

| | Solvent Composition | | |
|---|---|---|---|
| | Solvent other than Phosphazene Solvent | Volume Ratio of Phosphazene Solvent [%] | Discharge Capacity [$mAhg^{-1}$] |
| Comp. Example 20 | Ethylene Carbonate Ethyl Methyl Carbonate | 0 | 350 |
| Example 18 | Triglyme | 82 | 333 |
| Example 19 | Triglyme | 82 | 347 |

As shown in Table 9, Example 18, Example 19, and Comparative Example 20 all showed similar values ranging from 333 to 350 $mAhg^{-1}$. That is, despite the fact that the non-aqueous electrolytic solutions according to one aspect of the present invention contained a phosphazene solvent as a flame retardant in a large amount, specifically at a volume ratio of 82%, the non-aqueous electrolyte secondary cells using the electrolytic solutions according to the embodiment of the present invention showed a discharge capacity comparable to that in the case of using a conventional carbonate-containing electrolytic solution. This demonstrates that the non-aqueous electrolytic solution of the present invention has sufficient electrochemical stability to withstand the charge/discharge process in cells.

Example 20

An example of a sodium secondary cell including a non-aqueous electrolytic solution according to one aspect of the present invention will now be described.

$NaFe_{0.4}Mn_{0.3}Ni_{0.3}O_2$ was used as a positive electrode active material. The positive electrode active material, acetylene black as a conductive additive, and polyvinylidene fluoride as a binder were weighed at a weight ratio of 8:1:1, and dispersed in an NMP solvent to prepare a slurry. An Al current collector was coated with the prepared slurry using a coater. The coated collector was flattened by pressure with a mill and then stamped to give a 20 mm×20 mm square piece, which was processed into the form of an electrode. In this manner, a positive electrode was obtained.

A negative electrode was produced by press-bonding sodium metal to a 20 mm×20 mm square nickel mesh. The positive electrode and the negative electrode were opposed to each other across a polyethylene microporous membrane serving as a separator, and thus an electrode assembly having the configuration described for the first embodiment was produced.

The non-aqueous electrolytic solution of sample 50 in Example 8 was used as an electrolytic solution and injected into the electrode assembly, which was then sealed to produce a laminated sodium secondary cell.

Example 21

A sodium secondary cell was produced in exactly the same manner as in Example 20, except that the electrolytic solution used was a different one. In Example 21, the non-aqueous electrolytic solution of sample 52 in Example 9 was used.

Comparative Example 21

A sodium secondary cell was produced in exactly the same manner as in Example 20, except that the electrolytic solution used was a different one. The electrolytic solution used in Comparative Example 21 was a non-aqueous electrolytic solution prepared by dissolving $NaPF_6$ at a concentration of 1 mol/L in a solvent which was a mixture of ethylene carbonate and diethyl carbonate at a volume ratio of 1:3.

[Charge/Discharge Test]

A charge/discharge test was carried out on the sodium secondary cells of Example 20, Example 21, and Comparative Example 21 under the conditions described hereinafter. The charge/discharge test was performed in a constant-temperature chamber at 25° C. The test began with charge, after which there was a 30-minute intermission followed by discharge. This charge/discharge cycle was repeated three times. The charge was constant current charge performed with the current value set to give 0.05 C rate based on the theoretical capacity of the positive electrode active material. The maximum charge voltage was set at 3.8 V, and the minimum discharge voltage was set at 2.0 V. The discharge was performed at 0.05 C rate similarly to the charge.

A discharge capacity per 1 g of the positive electrode active material ($mAhg^{-1}$) was calculated for each cell after the three repetitions of the charge/discharge process by converting the discharge capacity measured at the third repetition in which stable charge/discharge process was observed. The obtained values of the capacity are shown in Table 10 below.

TABLE 10

| | Solvent Composition | | |
|---|---|---|---|
| | Solvent other than Phosphazene Solvent | Volume Ratio of Phosphazene Solvent [%] | Discharge Capacity [$mAhg^{-1}$] |
| Comp. Example 21 | Ethylene Carbonate Diethyl Carbonate | 0 | 98 |
| Example 20 | Monoglyme | 79 | 94 |
| Example 21 | Monoglyme | 79 | 88 |

As shown in Table 10, Example 20, Example 21, and Comparative Example 21 all showed similar values ranging from 88 to 98 $mAhg^{-1}$. That is, despite the fact that the non-aqueous electrolytic solutions according to one aspect of the present invention contained a phosphazene solvent as a flame retardant in a large amount, specifically at a volume ratio of 79%, the non-aqueous electrolyte secondary cells using the electrolytic solutions according to the embodiment of the present invention showed a discharge capacity comparable to that in the case of using a conventional carbonate-containing electrolytic solution. This demonstrates that, regardless of the difference in the type of the alkali metal of the alkali metal salt, the non-aqueous electrolytic solution of the present invention has sufficient electrochemical stability to withstand the charge/discharge process in cells.

Example 22

Non-graphitizable carbon was used as a negative electrode active material. The negative electrode active material and polyvinylidene fluoride as a binder were weighed at a weight ratio of 9:1, and dispersed in an NMP solvent to prepare a slurry. An Al current collector was coated with the prepared slurry using a coater. The coated collector was flattened by pressure with a mill and then stamped to give a 20 mm×20 mm square piece, which was processed into the form of an electrode. In this manner, a negative electrode was obtained.

A counter electrode was produced by press-bonding sodium metal to a 20 mm×20 mm square nickel mesh. The negative electrode and the counter electrode were opposed to each other across a polyethylene microporous membrane serving as a separator, and thus an electrode assembly having the configuration described for the first embodiment was produced.

The non-aqueous electrolytic solution of sample 50 in Example 8 was used as an electrolytic solution and injected into the electrode assembly, which was then sealed to produce a laminated sodium secondary cell.

Example 23

A sodium secondary cell was produced in exactly the same manner as in Example 22, except that the electrolytic solution used was a different one. In Example 23, the non-aqueous electrolytic solution of sample 52 in Example 9 was used.

Comparative Example 22

A sodium secondary cell was produced in exactly the same manner as in Example 22, except that the electrolytic solution used was a different one. The electrolytic solution used in Comparative Example 22 was a non-aqueous electrolytic solution prepared by dissolving $NaPF_6$ at a concentration of 1 mol/L in a solvent which was a mixture of ethylene carbonate and diethyl carbonate at a volume ratio of 1:3.

[Charge/Discharge Test]

A charge/discharge test was carried out on the sodium secondary cells of Example 22, Example 23, and Comparative Example 22 under the conditions described hereinafter. The charge/discharge test was performed in a constant-temperature chamber at 25° C. The test began with charge, after which there was a 30-minute intermission followed by discharge. This charge/discharge cycle was repeated three times. The charge was constant current/constant voltage charge in which the constant current value was set to give 0.05 C rate based on the theoretical capacity of the negative electrode active material. The minimum charge voltage was set at 0 V, and the minimum current value during the constant voltage charge was set at 0.005 C rate. The discharge was performed at 0.05 C rate similarly to the charge, with the maximum discharge voltage set at 2.0 V. A discharge capacity per 1 g of the negative electrode active material ($mAhg^{-1}$) was calculated for each cell after the three repetitions of the charge/discharge process by converting the discharge capacity measured at the third repetition in which stable charge/discharge process was observed. The obtained values of the capacity are shown in Table 11 below.

TABLE 11

| | Solvent Composition | | |
|---|---|---|---|
| | Solvent other than Phosphazene Solvent | Volume Ratio of Phosphazene Solvent [%] | Discharge Capacity [$mAhg^{-1}$] |
| Comp. Example 22 | Ethylene Carbonate Diethyl Carbonate | 0 | 253 |
| Example 22 | Monoglyme | 79 | 257 |
| Example 23 | Monoglyme | 79 | 255 |

As shown in Table 11, Example 22, Example 23, and Comparative Example 22 all showed similar values ranging from 253 to 257 $mAhg^{-1}$. That is, despite the fact that the non-aqueous electrolytic solutions according to one aspect of the present invention contained a phosphazene solvent as a flame retardant in a large amount, specifically at a volume ratio of 79%, the non-aqueous electrolyte secondary cells using the electrolytic solutions according to the embodiment of the present invention showed a discharge capacity comparable to that in the case of using a conventional carbonate-containing electrolytic solution. This demonstrates that, regardless of the difference in the type of the alkali metal of the alkali metal salt, the non-aqueous electrolytic solution of the present invention has sufficient electrochemical stability to withstand the charge/discharge process in cells.

As thus far described, in the case of a non-aqueous electrolytic solution including a glyme solvent and a phosphazene solvent as solvents in which is dissolved an alkali metal salt composed of an alkali metal cation and an anion, the ratio of the amount of the liquid phosphazene flame retardant added can be controlled more arbitrarily, with the result that the flexibility in designing an electrolytic solution can be increased. When, for example, the ratio of the amount of the liquid phosphazene flame retardant added is made higher than in conventional cases, a safer non-aqueous electrolytic solution can be provided.

Although the above examples use cyclic phosphazene compounds represented by the formula below where R is an ethyl group or a phenyl group, the invention is not limited to such examples. Even with the use of a phosphazene compound represented by the formula below where R is an alkoxy group, an aryloxy group, an alkyl group, an aryl group, an amino group, an alkylthio group, or an arylthio group, the ratio of the amount of the phosphazene compound added can be made high thanks to the fact that the glyme solvent is contained.

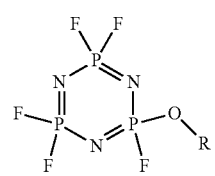

(3)

Example 24

In Example 24, non-aqueous electrolytic solutions 87 to 90 containing propylene carbonate as a carbonate solvent, a phosphazene solvent, and a glyme solvent were respectively prepared by adding tetraethylene glycol dimethyl ether as the glyme solvent to samples 58, 60, 61, and 63 in Comparative Example 14 until a homogeneous single phase was obtained in the solutions. The compatibility and electrical conductivity of each sample were evaluated in the same manner as in Example 1. The results are shown in Table 12.

In the above samples, the volume ratios of the phosphazene solvent to the total volume of the propylene carbonate, the phosphazene solvent, and the glyme solvent (total solvent volume) were 38%, 54%, 62%, and 77%, respectively, which means that high volume ratios were successfully achieved.

TABLE 12

| | | Volume Ratio of Phosphazene Solvent [%] | Evaluation Result | |
|---|---|---|---|---|
| | | | Compatibility | Electrical Conductivity [mS/cm] |
| Example 24 | Sample 87 | 38 | Good | 3.3 |
| | Sample 88 | 54 | Good | 3.1 |
| | Sample 89 | 62 | Good | 2.8 |
| | Sample 90 | 77 | Good | 1.5 |

Additionally, the same experiments were performed for the case where γ-butyrolactone, which is an ester compound, was used instead of propylene carbonate. As a result, it was confirmed that even with the use of such an ester solvent, the resulting non-aqueous electrolytic solution is likely to have a homogeneous single phase thanks to the addition of the glyme solvent, as in the case of using a carbonate solvent.

Example 25

A non-aqueous electrolytic solution was prepared in the same manner as in Example 1, except that the phosphazene solvent used was a mixture consisting of 37% of a compound represented by the formula (1) where $X^1$ to $X^6$ are all fluorine atoms; 31% of a compound represented by the formula (1) where one of $X^1$ to $X^6$ is a chlorine atom and the other five are fluorine atoms; and 32% of a compound represented by the formula (1) where two of $X^1$ to $X^6$ are chlorine atoms and the other four are fluorine atoms (the ratio between the average numbers of fluorine atoms and chlorine atoms in the mixture being such that there are five fluorine atoms per chlorine atom). The non-aqueous electrolytic solution of Example 25 was used as sample 91, in which the volume ratio of the phosphazene solvent to the total solvent volume was 43%. The compatibility and electrical conductivity of the sample were evaluated in the same manner as in Example 1.

It was confirmed that even with the use of such a mixture of phosphazene compounds as a phosphazene solvent, the addition of the glyme solvent allows the resulting non-aqueous electrolytic solution to contain the phosphazene solvent at a higher ratio than conventional non-aqueous electrolytic solutions.

TABLE 13

| | | Volume Ratio of Phosphazene Solvent [%] | Evaluation Result | |
|---|---|---|---|---|
| | | | Compat-ibility | Electrical Conductivity [mS/cm] |
| Example 25 | Sample 91 | 43 | Good | 1.2 |

INDUSTRIAL APPLICABILITY

Alkali metal secondary cells according to one aspect of the present invention can be used as: power sources for mobile electronic devices etc.; electricity storage devices for power leveling which are used in combination with power-generating facilities for thermal power generation, wind power generation, fuel cell power generation, etc.; power sources for electricity storage systems for emergency use or midnight use in general household and collective housing; uninterruptible power sources; and power sources for transportation apparatuses such as electrical automobiles, hybrid automobiles, and plug-in hybrid automobiles.

The invention claimed is:

1. A non-aqueous electrolytic solution comprising:
   a solvent component comprising a glyme solvent and a phosphazene solvent; and
   an alkali metal salt composed of an alkali metal cation and an anion, the alkali metal salt being dissolved in the solvent component, wherein:
   a volume ratio of the phosphazene solvent to a total solvent volume is 42% or more and 88% or less,
   the phosphazene solvent is a cyclic phosphazene compound represented by the following formula (1):

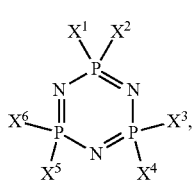

(1)

where $X^1$ to $X^6$ each independently represent a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic, the glyme solvent comprises a compound represented by the following formula (2):

$$R^2-O(CX^7X^8-CX^9X^{10}-O)_n-R^3 \quad (2),$$

where $X^7$ to $X^{10}$ each independently represent a hydrogen atom or a halogen atom, $R^2$ and $R^3$ each independently represent an aromatic group, an unsaturated aliphatic group, or a saturated aliphatic group, the aromatic group, the unsaturated aliphatic group, and the saturated aliphatic group each optionally contain a halogen atom, a nitrogen atom, an oxygen atom, a sulfur atom, or a silicon atom, the unsaturated aliphatic group and the saturated aliphatic group are each linear or cyclic, and n is an integer of 3 to 6.

2. The non-aqueous electrolytic solution according to claim 1, wherein in the formula (2), n is an integer of 3 or 4, and $X^7$ to $X^{10}$ are each a hydrogen atom.

3. The non-aqueous electrolytic solution according to claim 1, wherein the glyme solvent is a compound represented by the formula (2) where n is an integer of 3 or 4, and the glyme solvent is contained in an amount of 0.95 mol or more and 1.05 mol or less per mol of the alkali metal salt.

4. The non-aqueous electrolytic solution according to claim 1, wherein in the formula (2), n is 3.

5. The non-aqueous electrolytic solution according to claim 1, wherein the anion is at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2-CF_2CF_2SO_2-)^-$, and $[N-(SO_2F)-(SO_2CF_3)]^-$.

6. The non-aqueous electrolytic solution according to claim 1, wherein the solvent component further comprises at least one selected from the group consisting of a carbonate solvent and an ester solvent.

7. The non-aqueous electrolytic solution according to claim 1, wherein the alkali metal cation is a lithium ion or a sodium ion.

8. The non-aqueous electrolytic solution according to claim 1, wherein the glyme solvent coordinates to the alkali metal cation.

9. A non-aqueous electrolyte secondary cell comprising:
   the non-aqueous electrolytic solution according to claim 1;
   a positive electrode comprising a positive electrode active material capable of absorbing and releasing an alkali metal cation; and
   a negative electrode comprising a negative electrode active material capable of absorbing and releasing an alkali metal cation.

10. The non-aqueous electrolytic solution according to claim 1, wherein the volume ratio of the phosphazene solvent to the total solvent volume is 52% or more and 88% or less.

* * * * *